United States Patent [19]
Avitan

[11] Patent Number: 5,349,279
[45] Date of Patent: Sep. 20, 1994

[54] SPEED-DEPENDENT TRACTION MOTOR CONTROLLER FOR VEHICLES

[76] Inventor: Isaac Avitan, P.O. Box 2065, Sioux City, Iowa 51104

[21] Appl. No.: 968,138

[22] Filed: Oct. 29, 1992

[51] Int. Cl.$^5$ .............................................. H02P 5/34
[52] U.S. Cl. ..................................... 318/803; 318/599
[58] Field of Search .................................. 318/803, 599

[56] References Cited

U.S. PATENT DOCUMENTS

| | | | |
|---|---|---|---|
| 4,155,033 | 5/1979 | DeBell et al. | 318/599 |
| 5,039,924 | 8/1991 | Avitan | 318/803 |
| 5,070,283 | 12/1991 | Avitan | 318/803 |

Primary Examiner—William M. Shoop, Jr.
Assistant Examiner—Karen Masih
Attorney, Agent, or Firm—Natter & Natter

[57] ABSTRACT

The invention features a system for controlling separately excited shunt-wound dc motors, where control is achieved through microprocessor-based independent PWM control of a chopper (armature) and an H-bridge (field). Connected to the armature is an armature voltage amplifier for varying the applied armature voltage. A field voltage amplifier is also provided for determining the direction of motor rotation and varying the voltage applied to the field winding. A first sensor is connected to the wheel of the vehicle in which the motor resides in order to determine the wheel speed. A second sensor is connected to the armature circuit in order to determine the armature current. A third sensor is connected to the field circuit in order to determine the field current. A decoupling controller uses the wheel speed and armature current information, and adjusts the armature voltage and the field voltage. An optimal controller uses the wheel speed, field current and armature current information, and adjusts the armature voltage and the field voltage.

11 Claims, 5 Drawing Sheets

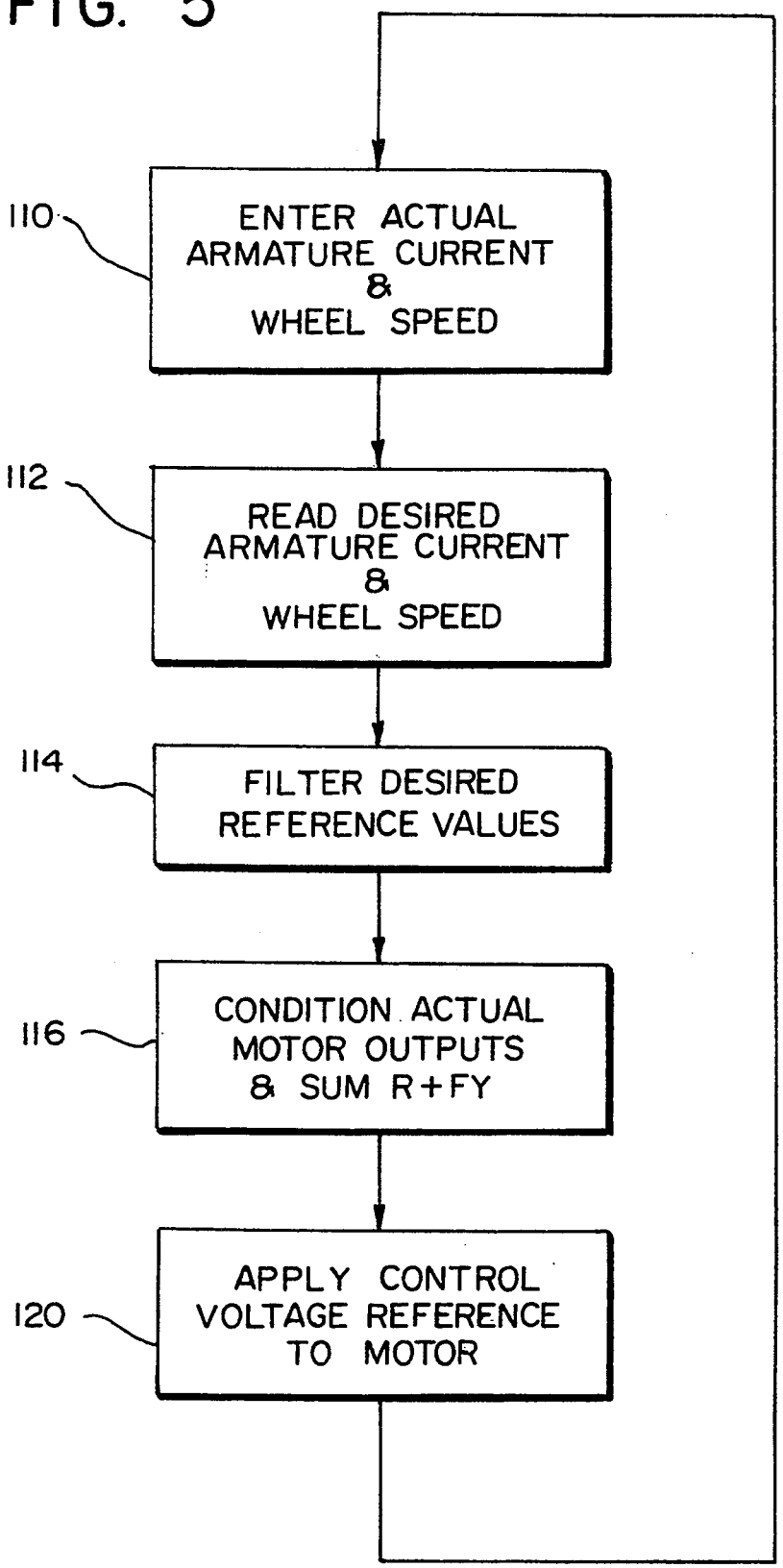

SPEED-DEPENDENT TRACTION MOTOR CONTROLLER FOR VEHICLES

RELATED APPLICATION

The present application is related to U.S. patent application, Ser. No. 07/986,127, filed concurrently herewith for "OPTIMIZING SYSTEM FOR VEHICLE TRACTION MOTORS".

BACKGROUND OF THE INVENTION

The present invention relates to dc motor controllers and, more particularly, to control systems for dc motors having separately excited armature and field windings.

Heavy duty material handling vehicles provided with electric motors typically use a lead-acid battery that can weigh many thousands of pounds. Besides providing the energy source to the vehicle, in many instances the battery also provides vehicle counterbalance.

The ratio of the load weight to the gross unloaded vehicle weight of industrial lift trucks is extremely important. For example, if an unladen vehicle weighs 12,000 lbs, and the maximum load weight it can carry is 4,000 lbs, then the gross unladen/laden weight may vary from as little as 12,000 to as much as 16,000 lbs. This represents a change of 33% in motor torque requirements. Moreover, the vehicle must be able to maneuver on loading ramps, further increasing the motor torque requirements. For these and other reasons, a control system capable of extracting precise and efficient work from the vehicle is desirable.

The main motive element of this type of vehicle, referred to as the traction system, usually consists of a series-wound dc motor coupled to a gear reducer and drive wheel.

The rotational direction of the series-wound dc motor is controlled by the polarity orientation of the field winding with respect to the armature. Generally, the field winding orientation is controlled through a pair of contactors, such that when power is applied across the field-armature combination, the motor is caused to rotate in the desired direction.

The series-wound dc motor, heretofore used extensively in industrial lift trucks, features one very important characteristic: it has high torque at zero speed. This is extremely useful in providing the necessary starting torque.

Typically, the field-armature combination is controlled as a single unit. Motor speed regulation is most often achieved through voltage switching utilizing such power semiconductor technologies as silicon-controlled-rectifiers (SCRs). The voltage drop associated with the SCR as well its duty cycle limit impose a speed limit on the motor.

However, a series dc motor may operate only along its characteristic commutation curve limit. Since changing torque loading arises from variations in load capacities, travel path conditions and grade variations, motor speed variations occur.

With the proper controls, the use of a shunt-wound dc motor under independent field and armature control can provide distinct advantages over conventional series-wound dc motors for lift truck applications.

U.S. Pat. No. 4,079,301 issued to Johnson, III discloses a dc motor control circuit having separately excited armature and field windings. The control circuit is operable in both the constant torque and constant horsepower modes. The transfer characteristics of the circuit provide high gain at low frequencies and low gain at higher frequencies. The circuit can further reduce the gain at low frequencies when motor operation switches from the constant torque mode to the constant horsepower mode.

U.S. Pat. No. 5,070,283, issued to the present applicant and hereby incorporated by reference, discloses a control method that provides a shunt-wound dc motor with the ability to simulate a series-wound dc motor, hence developing the necessary starting torque. Feedback is provided by an encoder, connected to the armature of the motor, for indicating motor speed.

Unfortunately, monitoring motor speed is an indirect method of determining the speed of the vehicle itself. Moreover, since the speed of the traction motor is not always linearly proportional to the actual speed of the vehicle (e.g., when turning), attempting to control the motor based solely on the speed thereof is not necessarily the most accurate vehicle speed control method.

Moreover, connecting or attaching an encoder to the armature of the motor is often problematical. Not only must space considerations be taken into account, but heat dissipation techniques must be employed.

It would be advantageous to provide a system for controlling a motor based on data representative of motor speed, but not to require motor speed measurement at or near the motor itself.

It would also be advantageous to provide a system for controlling a motor that is based on direct speed measurement of the wheel(s) driven by that motor.

It would also be advantageous to provide such a system in which the motor can be controlled by a decoupling controller.

It would still further be advantageous to provide such a system in which the decoupling controller is achieved using software.

SUMMARY OF THE INVENTION

A separately excited dc motor is the main motive mechanism replacement for the traditional series-wound dc motor. Independent field and armature control enables control of a motor anywhere along, and below its characteristic commutation curve limit. Independent field control extends controllability of the motor, thereby making the system less sensitive to variations in load capacities, travel path conditions and grade variations. Since the dc motor's field windings require far less current than its series-wound counterpart, it is economically feasible to apply full variability (voltage switching) field control.

Field and armature voltage switching is achieved through the utilization of power transistors instead of traditional SCRs, which are limited in switching speed and require additional circuitry due to their non-self-commutating characteristics.

In accordance with the present invention, there is provided a system for controlling separately excited wound dc motors, where control is achieved through microprocessor-based independent pulse-width-modulation (PWM) control of a chopper (armature) and an H-bridge (field). Connected to the armature is an armature voltage amplifier for varying the applied armature voltage. A field voltage amplifier is also provided for varying the voltage applied to the field winding. A first sensor is connected to the vehicle's driven wheel(s) in order to determine the wheel speed and derive the motor speed. A second sensor is connected to the armature circuit in order to determine the armature current. A third sensor is connected to the field circuit in order to determine the field current. A decoupling controller uses the wheel speed and armature current information and adjusts the armature voltage and the field voltage.

The aforementioned system enables precise velocity control, precise torque control, optimized efficiency, increased performance, increased reliability and decreased cost-of-ownership.

BRIEF DESCRIPTION OF THE DRAWINGS

A complete understanding of the present invention may be obtained by reference to the accompanying drawings, when taken in conjunction with the detailed description thereof and in which:

FIG. 5 is a flow chart of decoupling controller operation.

DESCRIPTION OF THE PREFERRED EMBODIMENT

Before describing the preferred embodiment of the present invention, it is desirable to discuss briefly the speed-torque characteristics of a series-wound dc motor.

Figure 1:
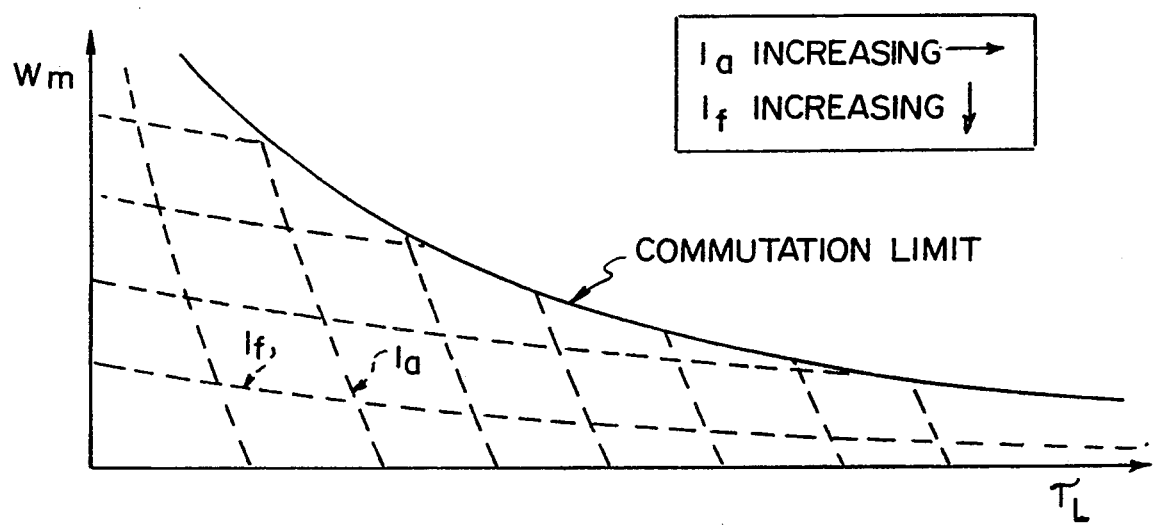
FIG. 1 is a graphical representation of a typical speed-torque relationship for series-wound dc motor.

Referring now to FIG. 1, there is shown a typical speed-torque graph for a series-wound dc motor showing the characteristic commutation limit, field current $I_f$ lines, and the armature current $I_a$ lines.

As discussed above, under conventional control a dc motor is restricted to operation along its characteristic commutation limit as represented by the motor rotational speed $\omega_m$ and motor shaft torque loading $\tau_L$. Hence, as can be seen from FIG. 1, a change in $\tau_L$ results in a change in $\omega_m$.

However, under independent and fully variable field and armature control, a change in $\tau_L$ not necessarily result in a change in $\omega_m$. Rather, a control system in accordance with the present invention, and described in greater detail hereinbelow, can select a new motor operating point through $I_a$ and $I_f$ under the commutation limit resulting in an unchanged $\omega_m$ for the new torque loading value $\tau_L$.

Figure 2:
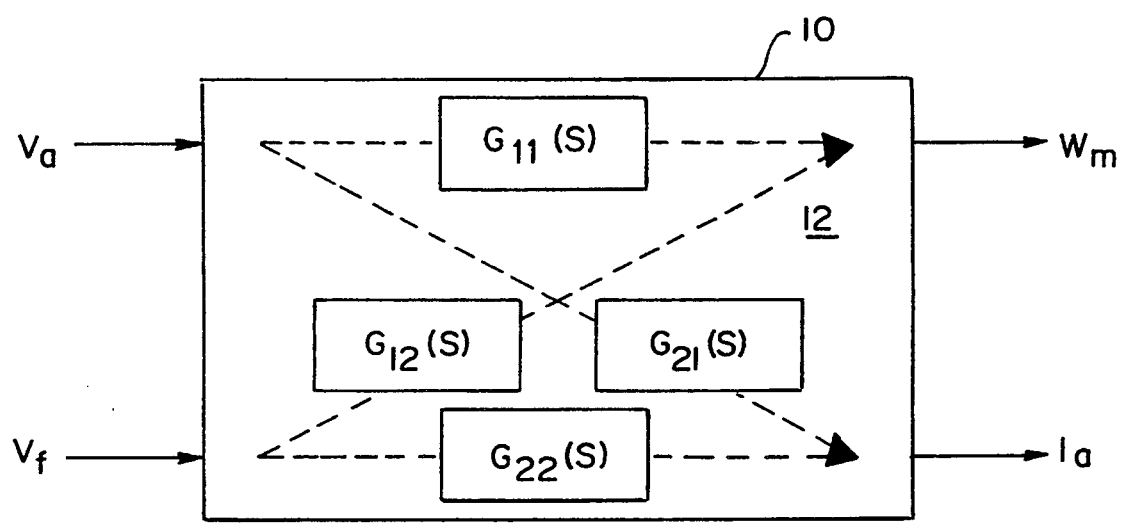
FIG. 2 is a block diagram of a multi-variable coupled system representation of a shunt-wound dc motor showing its particular internal channel transfer functions.

Referring now to FIG. 2, there is shown a block diagram of a multi-variable coupled system representation of a series- or shunt-wound dc motor.

An applied armature voltage $V_a$ and an applied field voltage $V_f$ are input to a motor 10. The physical transformations within the motor 10 may be suitably represented by cross channel transfer functions 12, to produce the motor rotational speed $\omega_m$ and armature current $I_a$ as outputs.

From an analysis of a series- or shunt-wound dc motor, it can be seen that the motor 10 consists of two first-order and two second-order dynamic systems. Such a motor system may be represented in the s-domain (Laplace transformation) by the transfer functions $G_{11}(s)$, $G_{12}(s)$, $G_{21}(s)$ and $G_{22}(s)$.

These transfer functions 12 are representative of the particular channels of the motor system defined as follows, $$G_{11}(s) = \omega_m(s)/V_a(s)$$

$$G_{12}(s) = \omega_m(s)/V_f(s)$$

$$G_{21}(s) = I_a(s)/V_a(s)$$

$$G_{22}(s) = I_a(s)/V_f(s)$$

where $G_{11}(s)$ and $G_{12}(s)$ are first-order systems, and $G_{21}(s)$ and $G_{22}(s)$ are second-order systems. Determination of these transfer functions 12 is analytical as well as experimental.

Figures 3, 3A:
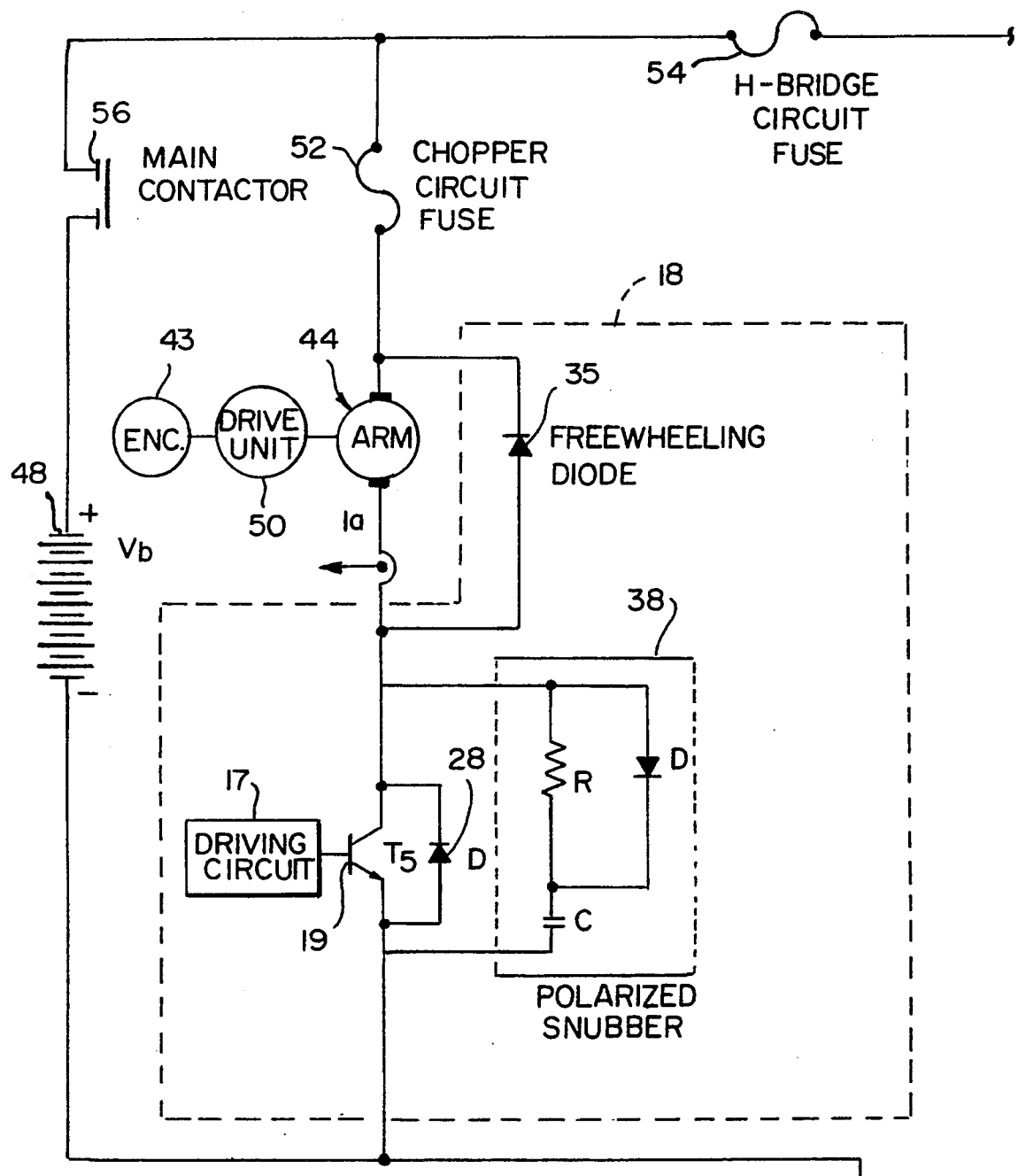
FIGS. 3a & 3b is a schematic diagram of the preferred embodiment of a dc motor control circuit in accordance with the present invention.
Figure 3B:
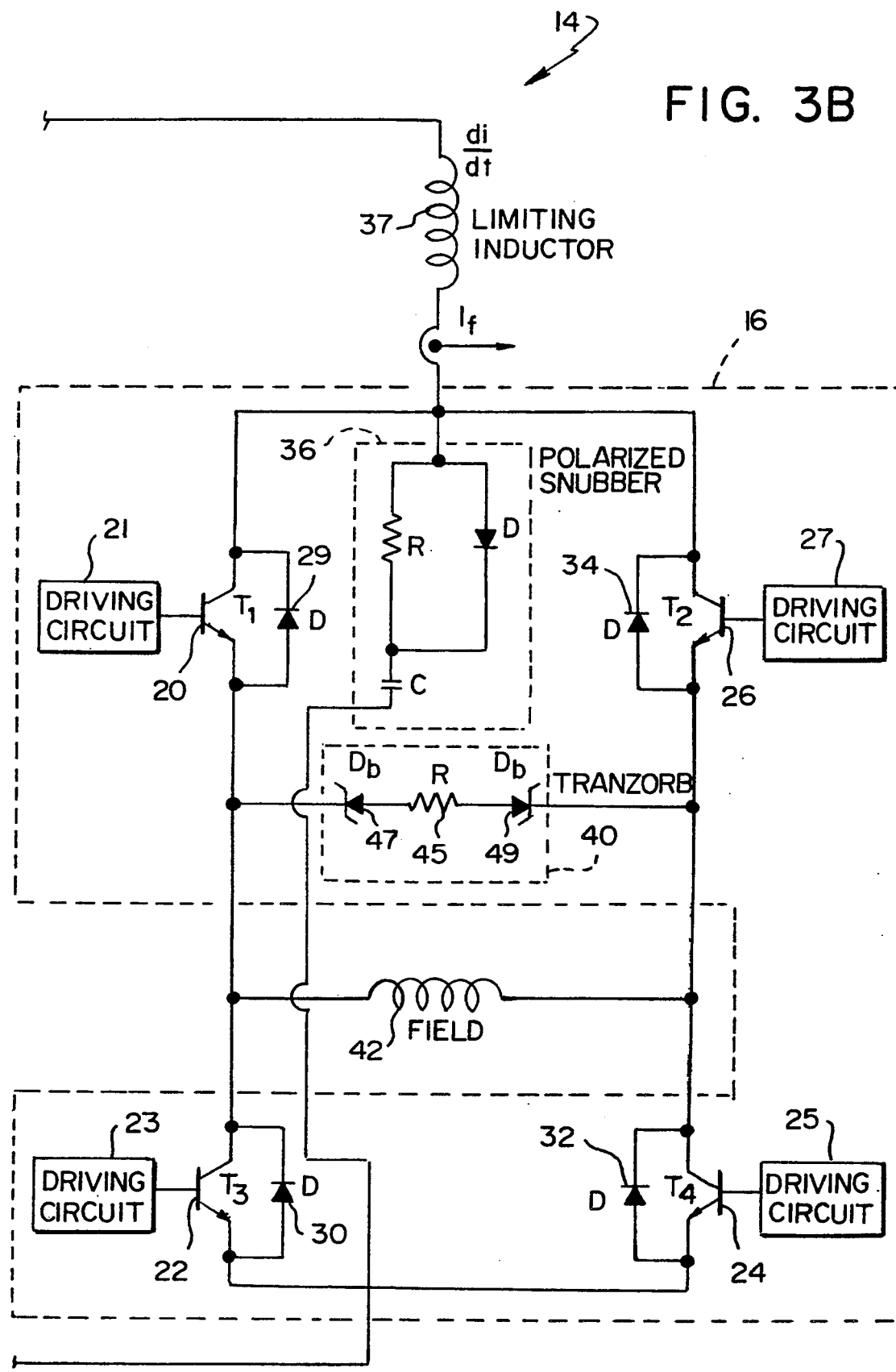

Referring now also to FIG. 3, consisting of FIGS. 3A and 3B, there is shown a schematic diagram of a dc motor control circuit, shown generally as reference numeral 14, which provides independent control of a wound dc motor by independently controlling its armature winding 44 and field winding 42. A vehicle drive unit 50 is driven by the motor and, more specifically, the motor armature 44. It should be understood that any suitable apparatus for imparting motion to a vehicle (e.g., a gear reduction box, a set of attached gears, or any combination of mechanical components that achieve non-slip gear reduction) could be used.

A suitable means for providing a feedback signal is indicated by encoder 43, which is preferably connected at the driven wheel(s), not shown, of drive unit 50. It will, of course, be obvious to those skilled in the art that any suitable encoder can be employed to perform the wheel speed sensing function.

Once the rotational wheel speed $\omega_w$ has been determined by encoder 43, by knowing the gear ratio N of motor-to-wheel, the rotational motor speed $\omega_m$ can be determined as follows:

$$\omega_m = \omega_w \cdot N$$

The primary components of motor control circuit 14 are a chopper circuit 18 which controls armature winding 44 and an H-Bridge circuit 16 which controls field winding 42. Two pairs of transistors 20, 24 and 26, 22 are connected to field winding 42, as shown.

Power is supplied to motor control circuit 14 by a dc battery 48. A main power contactor 56 is connected to battery 48 and chopper circuit 18 and H-Bridge circuit 16. Main contactor 56 enables system shut down should any system element fail.

A chopper circuit fuse 52 is connected between main contactor 56 and chopper circuit 18 to limit excessive current to chopper circuit 18. An H-Bridge circuit fuse 54 is connected between main contactor 56 and H-Bridge circuit 16 to limit excessive current to H-Bridge circuit 16.

Power regulation through armature winding 44 and field winding 42 is achieved through transistors 19 (in chopper circuit 18) and transistors 20, 22, 24 and 26 (in H-Bridge circuit 16). Control of transistors 19, 20, 22, 24 and 26 is achieved through driving circuits 17, 21, 23, 25 and 27, respectively. Motor rotation direction is dictated by the field winding 42 orientation with respect to the armature winding 44. Field winding 42 orientation is controlled by transistor pairs 22, 26 and 20, 24.

The ON-OFF ratio of transistors 19, 20, 22, 24 and 26 results in an average applied terminal voltage to armature winding 44 and field winding 42, respectively. As such, totally independent and fully variable control of armature winding 44 and field winding 42 is achieved.

Polarized snubber circuits 36 and 38 are provided in H-Bridge circuit 16 and chopper circuit 18 respectively to:

a) absorb switching power losses of transistors 19 (in chopper circuit 18), and transistors 20, 22, 24, 26 (in H-Bridge circuit 16);

b) prevent secondary breakdown due to localized heating effects during turn-on and turn-off of transistors; and c) prevent spurious turn-on of transistors due to dV/dt.

Free wheeling diodes 28, 29, 30, 32 and 34 provide a path for current upon turn-off of transistors 19, 20, 22, 24 and 26, respectively. Another free wheeling diode 35 is provided across armature 44, also to provide a current path when chopper circuit transistor 19 is turned off.

A dI/dt limiting inductor 37 is provided between H-Bridge circuit fuse 54 and H-Bridge circuit 16 to restrict the rate of rise of current through the H-Bridge circuit 16. This dI/dt limiting inductor 37 protects the H-Bridge circuit transistors 20, 22, 24 and 26 from armature voltage spikes. A pair of back-to-back breakdown diodes 47, 49 and a resistor 45 form a tranzorb 40 across field winding 42 to limit the field voltage.

Figure 4:
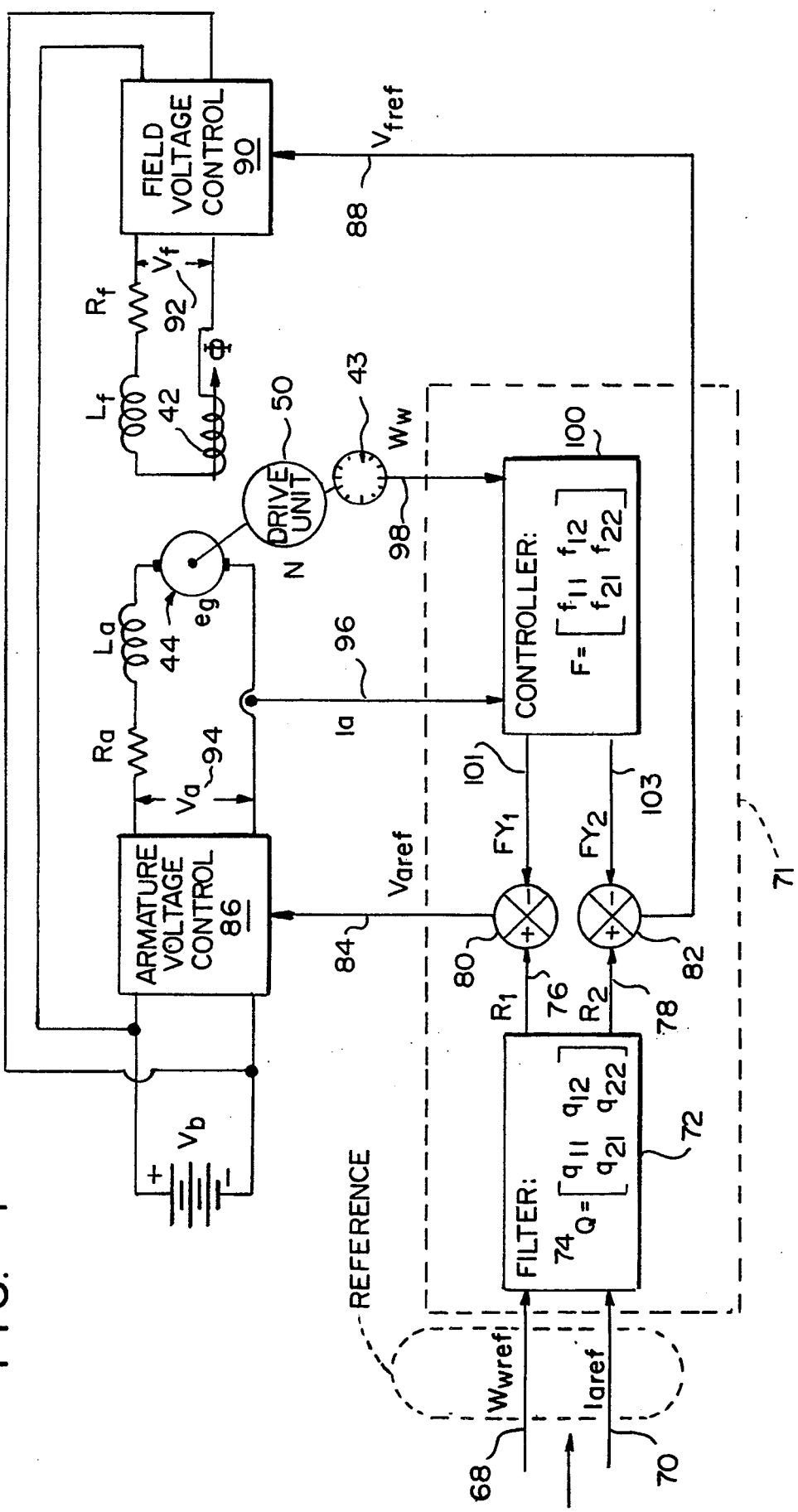
FIG. 4 is a block diagram of the decoupling control system.

Referring now also to FIG. 4, there is shown a schematic block diagram of the separately excited dc motor decoupling control system.

Armature voltage control amplifier 86 adjusts armature voltage $I_a$ 94, by controlling the chopper driving circuit 17 which causes the speed of motor 44 to vary. Encoder 43 is connected to drive unit 50 to sense angular rotational speed of the driven wheel(s) and to generate a continuous signal representative of such wheel speed $\omega_w$.

A programmable, microprocessor-based decoupling control system is shown generally at reference numeral 71. The functions of control system 71 can be accomplished by a processor such as a Model No. 68HC11 microprocessor manufactured by Motorola Corp. The unfiltered wheel speed reference $\omega_{wref}$ and the unfiltered armature current reference $I_{aref}$ are input via respective lines 68 and 70 to control system 71 and more specifically to a filter 72.

Within filter 72 is a 2×2 filter matrix Q 74. Using basic matrix algebra, the desired wheel rotational speed reference $\omega_{wref}$ and desired armature current reference $I_{aref}$ are transformed to produce filtered input references $R_1$ and $R_2$ applied to lines 76 and 78.

Also within processor control system 71 is a controller 100. Motor outputs of armature current $I_a$ and wheel speed $\omega_w$ are input via respective lines 96 and 98 to controller 100. Within controller 100 is a 2×2 feedback controller matrix F 99. Since 1×2 matrix Y consists of signals $I_a$ and $\omega_w$, by performing basic matrix algebra, controller 100 produces conditioned motor outputs $FY_1$ and $FY_2$ applied over lines 101 and 103.

Filtered input references $R_1$ and $R_2$ enter summers 80 and 82 over lines 76 and 78, respectively. Also entering summers 80 and 82 over lines 101 and 103 are conditioned motor outputs $FY_1$ and $FY_2$, respectively. Summer 80 produces an armature control voltage $V_{aref}$ applied to line 84. This can be represented mathematically as $V_{aref} = R_1 - FY_1$. In the same manner, summer 82 produces a field control voltage reference $V_{fref}$ applied to line 88. Together, armature control voltage $V_{aref}$ and field control voltage $V_{fref}$ form the system control effort as a function of filtered input references $R_1$, $R_2$ and conditioned motor outputs $FY_1$, $FY_2$.

The existing control effort is then applied to the motor 44 and field 42 as follows. Armature control voltage reference $V_{aref}$ enters an armature voltage control amplifier 86, which amplifies armature control voltage reference $V_{aref}$ to produce armature voltage $V_a$ 94, which is then applied to motor 44, which provides an armature current $I_a$ over line 96. While the motor is generally referred to as reference numeral 44, also included in the motor are armature resistance $R_a$ and armature inductance $L_a$.

Field control voltage reference $V_{fref}$ enters a field voltage control amplifier 90, which amplifies field control voltage reference $V_{fref}$ to produce a field voltage $V_f$ 92 by controlling the H-Bridge driving circuits 21, 23, 25 and 27 which is then applied to field 42. While the field is generally referred to as reference numeral 42, also included in the field are field resistance $R_f$ and field inductance $L_f$.

Referring now also to FIG. 5, there is shown a flow chart of decoupling controller operations. It should be noted that the diagram represents only one of a series of repeating cycles.

Data representative of armature current $I_a$ and wheel speed $\omega_w$ is entered, step 110. It should be noted that, when the vehicle is moving on a substantially straight line path, vehicle speed is easily derived from wheel speed once the radius "r" of the wheel is known. The relationship is:

*Vehicle speed* $= 2\pi r \omega_w$

Desired output matrix R and motor output matrix Y are read, step 112. Desired output matrix R is a matrix of unfiltered input armature current and wheel speed references, $I_a$ and $\omega_w$. Matrix Y is the actual wheel speed $\omega_w$ and armature current $I_a$.

Filter matrix Q filters input references, step 114, to result in filtered input references $R_1$ and $R_2$. Feedback controller matrix F, step 116, conditions motor output $I_a$ and encoder output $\omega_w$ to result in $FY_1$, $FY_2$. The applied control voltage (effort) $V_{ref}$ is then calculated (summed) as the difference between filtered input reference R and conditioned motor output FY. Matrix $V_{ref}$ is an armature control voltage reference $V_{aref}$ and a field control voltage reference $V_{fref}$.

The applied control voltage effort $V_{ref}$ is then applied to motor, step 120, and the cycle repeats.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. In a vehicle having a driven wheel and a dc electric traction motor with separately excited armature and field windings, an apparatus for decoupling control of the vehicle dc traction motor, comprising:

a) a motor having an armature, an armature winding and a field winding, said windings being independently controlled;

b) armature voltage amplifying means operatively connected to the armature of said motor for varying voltage applied thereto;

c) armature current sensing means operatively connected to said armature winding for sensing armature current;
d) field voltage amplifying means operatively connected to the field winding of said motor for varying voltage applied thereto;
e) speed sensing means comprising encoder means positioned adjacent the driven wheel, the encoder means being operatively connected to the driven wheel for generating a signal representative of the speed of said driven wheel;
f) means for providing a first reference signal proportional to desired driven wheel speed;
g) means for providing a second reference signal proportional to desired armature current;
h) decoupling controller means for receiving said first and second reference signals, said decoupling controlling means being operatively connected to said armature voltage amplifying means and to said field voltage amplifying means for controlling respective operation thereof; and
i) said encoder means including means for applying said driven wheel speed signal to said decoupling controlling means.

2. The decoupling control apparatus of claim 1 wherein said decoupling controlling means comprises filter means and feedback controlling means.

3. The decoupling control apparatus of claim 2 wherein said decoupling controlling means further comprises summing means operatively connected to said filter means and to said feedback controlling means for providing a control signal to said armature voltage amplifying means and to said field voltage amplifying means.

4. The decoupling control apparatus of claim 1 further comprising:
j) a power semiconductor operatively connected to said motor armature for providing voltage regulation thereof.

5. The decoupling control apparatus of claim 4 further comprising:

k) two pairs of semiconductors operatively connected to said field winding for providing voltage regulation and motor direction.

6. The decoupling control apparatus of claim 2 wherein said armature current sensing means generates a signal applied to said feedback controlling means.

7. The decoupling control apparatus of claim 1 wherein said decoupling controlling means operates in accordance with computer software instructions.

8. In an electric motor-driven wheeled vehicle, a method for controlling a dc motor having separately excited armature and field windings, the method comprising the steps of:
(a) reading input reference signals representative of desired wheel speed and armature current;
(b) sensing the actual speed of a vehicle wheel at a location adjacent the wheel and generating a signal representative of actual wheel speed,
(c) reading the signal representative of actual wheel speed and a signal representative of armature current;
(d) generating a filtered input reference with a filter;
(e) generating a conditioned motor output with a feedback controller;
(f) deriving a filtered input reference from each input reference signal;
(g) computing a conditioned motor output from the signals representative of actual wheel speed and armature current; and
(h) computing and applying control effort as a function of said filtered input reference and said conditioned motor output.

9. The method for controlling a dc motor of claim 8, the method further comprising
(i) repeating steps (a)–(h) to update said computed control effort when said control effort is computed.

10. The method for controlling a dc motor of claim 8, the method further comprising
(i) converting said signals representative of actual and desired wheel speed to signals respectively representative of actual and desired motor speed.

11. The method for controlling a dc motor of claim 10, the method further comprising
(j) repeating steps (a)–(i) to update said computed control effort.

* * * * *